(12) United States Patent
Sasaki et al.

(10) Patent No.: US 10,782,635 B2
(45) Date of Patent: Sep. 22, 2020

(54) INTERMEDIATE TRANSFER BODY, METHOD FOR MANUFACTURING THE SAME, AND IMAGE FORMING DEVICE

(71) Applicant: Konica Minolta, Inc., Tokyo (JP)

(72) Inventors: Teruo Sasaki, Hino (JP); Akihiro Honya, Musashino (JP); Kazunori Kurimoto, Chofu (JP)

(73) Assignee: KONICA MINOLTA, INC., Tokyo (JP)

( * ) Notice: Subject to any disclaimer, the term of this patent is extended or adjusted under 35 U.S.C. 154(b) by 44 days.

(21) Appl. No.: 15/976,250

(22) Filed: May 10, 2018

(65) Prior Publication Data

US 2018/0364621 A1   Dec. 20, 2018

(30) Foreign Application Priority Data

Jun. 14, 2017   (JP) .................. 2017-116726

(51) Int. Cl.
| | |
|---|---|
| *G03G 15/14* | (2006.01) |
| *G03G 15/16* | (2006.01) |
| *B32B 27/28* | (2006.01) |
| *B32B 33/00* | (2006.01) |
| *B29D 29/06* | (2006.01) |

(52) U.S. Cl.
CPC .......... *G03G 15/162* (2013.01); *B29D 29/06* (2013.01); *B32B 27/281* (2013.01); *B32B 27/285* (2013.01); *B32B 33/00* (2013.01); *B32B 2255/10* (2013.01); *B32B 2255/20* (2013.01); *B32B 2307/302* (2013.01); *B32B 2311/18* (2013.01); *B32B 2371/00* (2013.01); *B32B 2379/08* (2013.01)

(58) Field of Classification Search
CPC ............ G03G 15/161; G03G 15/1685; G03G 2215/1661; G03G 15/162; B29D 29/06; B32B 27/281; B32B 27/285; B32B 33/00; B32B 2255/10; B32B 2255/20; B32B 2307/302; B32B 2311/18; B32B 2371/00; B32B 2379/08
See application file for complete search history.

(56) References Cited

U.S. PATENT DOCUMENTS

| | | | | |
|---|---|---|---|---|
| 2004/0110855 | A1* | 6/2004 | Yoshikawa | ............ C08J 9/0047 521/85 |
| 2010/0098466 | A1* | 4/2010 | Maehara | ............... C23C 16/401 399/308 |
| 2011/0048324 | A1* | 3/2011 | Yamashita | ................. B41J 2/01 118/620 |
| 2013/0052572 | A1* | 2/2013 | Nukada | .................. G03G 15/75 430/56 |
| 2017/0168406 | A1* | 6/2017 | Sakimura | ............... G03G 5/047 |
| 2017/0285533 | A1* | 10/2017 | Honya | ................. G03G 15/162 |

FOREIGN PATENT DOCUMENTS

| | | |
|---|---|---|
| JP | H11268147 A | 10/1999 |
| JP | 2011197230 A | 10/2011 |
| JP | 2017040871 A | 2/2017 |
| WO | 2008105338 A1 | 9/2008 |

* cited by examiner

*Primary Examiner* — Clayton E. LaBalle
*Assistant Examiner* — Michael A Harrison
(74) *Attorney, Agent, or Firm* — Lucas & Mercanti, LLP

(57) ABSTRACT

An intermediate transfer body includes: a base layer made of a resin; and a surface layer disposed on the base layer, wherein the surface layer is an integral object of inorganic oxide and contains a black titanium compound dispersed in the surface layer.

10 Claims, 3 Drawing Sheets

INTERMEDIATE TRANSFER BODY, METHOD FOR MANUFACTURING THE SAME, AND IMAGE FORMING DEVICE

The entire disclosure of Japanese patent Application No. 2017-116726, filed on Jun. 14, 2017, is incorporated herein by reference in its entirety.

BACKGROUND

Technological Field

The present invention relates to an intermediate transfer body, a method for manufacturing the same, and an image forming device including the intermediate transfer body.

Description of the Related art

In an electrophotographic image forming device, for example, a latent image formed on a photoreceptor is developed with a toner, the obtained toner image is temporarily held on an endless belt-shaped intermediate transfer body, and the toner image on the intermediate transfer body is transferred onto a recording medium such as paper.

As such an intermediate transfer body, an intermediate transfer body including a surface layer of a ceramic film for enhancing durability thereof is known, and a technique of manufacturing the film by a sol-gel method is known (see, for example, JP 2011-197230 A and WO 2008/105338 A). Furthermore, as the intermediate transfer body, an endless intermediate transfer belt including a surface layer obtained by heating and solidifying a coating film of a resin solution in which titanium black is dispersed is known (see, for example, JP 11-268147 A). In addition, as the intermediate transfer body, an endless intermediate transfer belt including a surface layer formed by polymerization of monomers and having titanium oxynitride dispersed therein is known (see, for example, JP 2017-40871 A).

The ceramic film (surface layer) can be formed of a metal oxide by hydrolysis and dehydration condensation of, for example, an organometallic compound (metal alkoxide or the like). The ceramic film has high hardness but is easily cracked. This is because the surface layer made of a metal oxide cannot sufficiently relax a local stress due to a high elastic modulus and is easily cracked consequently.

This problem that the surface layer is easily cracked can be solved, for example, by hydrolyzing a metal alkoxide such that a part of the alkoxide of the metal alkoxide remains However, the alkoxide remaining in this manner becomes a polar functional group (for example, a hydroxy group) of an alcohol derivative and is hydrolyzed over time. As a result, electric characteristics of the intermediate transfer body may change during long-term use.

In an intermediate transfer body described in JP 2017-40871 A, a monomer of a resin constituting a surface layer remains, and a polymerizable portion in the monomer is deteriorated by a discharge product (for example, ozone) generated by energization during use of the intermediate transfer body to become an oxide having a carbonyl group or the like. As a result, electric resistance or the like is changed, and image quality may be insufficient after long-term use. As described above, in the conventional intermediate transfer body, there remains room for study from a viewpoint of mechanical durability and long-term stability of electric characteristics.

SUMMARY

A first object of the present invention is to provide an intermediate transfer body having mechanical durability and stable electric characteristics over a long period of time.

In addition, a second object of the present invention is to provide an image forming device suppressing image defects due to transfer failure over a long period of time and capable of forming a high-quality image by an electrophotographic method.

To achieve at least one of the abovementioned objects, according to an aspect of the present invention, an intermediate transfer body reflecting one aspect of the present invention comprises: a base layer made of a resin; and a surface layer disposed on the base layer, wherein the surface layer is an integral object of inorganic oxide and contains a black titanium compound dispersed in the surface layer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
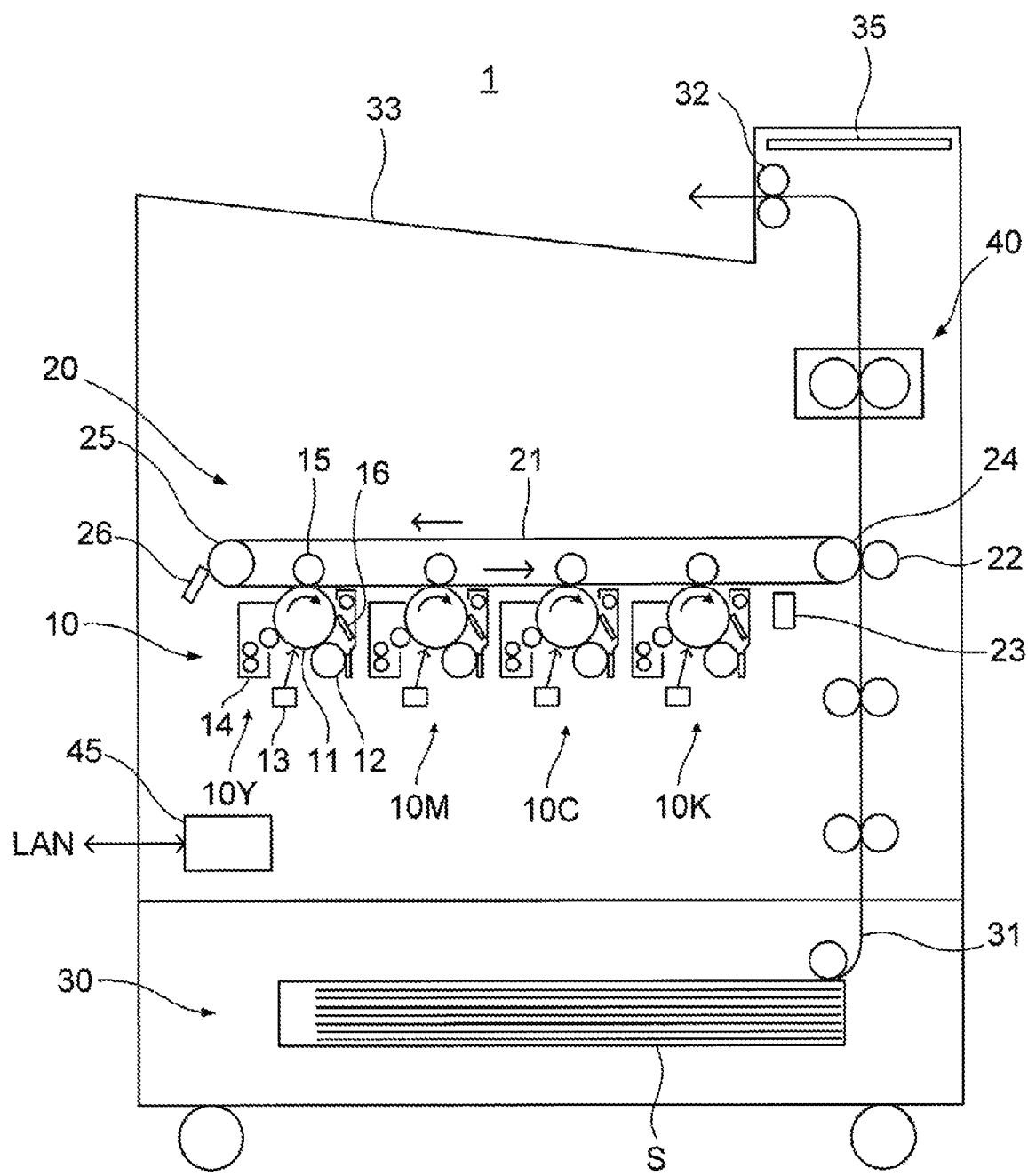
FIG. 1 is a view schematically illustrating a configuration of an image forming device according to an embodiment of the present invention.

Hereinafter, one or more embodiments of the present invention will be described with reference to the drawings. However, the scope of the invention is not limited to the disclosed embodiments.

An intermediate transfer body according to an embodiment of the present invention includes a base layer made of a resin and a surface layer disposed on the base layer. The form of the intermediate transfer body can be appropriately determined within a range in which a desired function is exhibited and may be, for example, a cylindrical intermediate transfer drum or an endless belt-shaped intermediate transfer belt. The intermediate transfer body is preferably the intermediate transfer belt from a viewpoint of space saving in disposing an image forming unit in an image forming device.

The resin constituting the base layer can be appropriately selected from resins which are not denatured or deformed within a range of a use temperature of the intermediate transfer body. The resins may be used singly or in combination thereof, and examples thereof include polycarbonate, polyphenylene sulfide (PPS), polyvinylidene fluoride, polyimide (PI), polyamide imide (PAT), polyethylene naphthalate (PEN), polyalkylene terephthalate, polyether, polyether ketone, polyether ether ketone (PEEK), polyether ester amide, an ethylene tetrafluoroethylene copolymer, and polyamide. Examples of the polyalkylene terephthalate include polyethylene terephthalate and polybutylene terephthalate.

As the resin, polyimide, polycarbonate, polyphenylene sulfide, polyamide imide, polyethylene naphthalate, polyether ether ketone, or polyalkylene terephthalate is preferably contained from a viewpoint of durability against bending in a state of tension, and polyimide, polyamide imide, polyethylene naphthalate, or polyether ether ketone is more preferably contained from a viewpoint of the durability and heat resistance.

The electric resistance value of the base layer is preferably $10^5$ to $10^{11}$ Ω·cm in terms of volume resistivity from viewpoints of appropriately setting conditions for transferring a toner image from a photoconductor to an intermediate transfer body, appropriately setting conditions for transferring a toner image from the intermediate transfer body to a subsequent medium, appropriately setting a toner image density, and the like. The electric resistance value can be measured by, for example, a known method, and can be adjusted by, for example, adding a conductive material into the base layer.

Examples of the conductive material include carbon black and carbon nanofibers. The carbon black may be neutral carbon black or acidic carbon black. The content of the conductive material in the base layer can be appropriately determined within a range in which a desired electric resistance value is realized, and is preferably 10 to 20 parts by mass, and more preferably 10 to 16 parts by mass with respect to 100 parts by mass of the resin.

If the thickness of the base layer is too thin, strength and durability of the base layer may be insufficient. If the thickness of the base layer is too thick, cracking may occur by accumulation of strain due to expansion and contraction caused by a change in temperature and continuous application of a bending stress. The thickness of the base layer is preferably 50 to 200 μm from viewpoints of securing strength and mechanical durability of the intermediate transfer body and preventing cracking due to deformation caused by a change in temperature and a continuous bending stress.

The base layer may further contain a component other than the above resin within a range where an effect of the present embodiment can be obtained. The other component may be one kind or more, and examples thereof include the above conductive material and a dispersant such as a nylon compound.

The base layer can be manufactured by a known method. For example, the base layer can be manufactured by melting and kneading the resin with an extruder, extruding the resin from a circular die, and cutting the formed tubular base layer in round slices. Such a method for manufacturing a base layer is advantageous, for example, in a case where the resin is PPS or soluble polyimide. In addition, the base layer can be manufactured by applying a coating material for a base layer onto an outer peripheral surface of a tubular base body and solidifying the formed coating film. Such a method for manufacturing a base layer is effective, for example, in a case where the resin is PI or PAI.

Polyimide can be obtained by heating polyamic acid which is a precursor of polyimide. Polyamic acid can be obtained, for example, by a reaction between tetracarboxylic acid dianhydride and diamine in an equimolar amount. Note that the content of polyimide in the base layer is, for example, 51% by mass or more.

The surface layer is a layer constituting a surface of the intermediate transfer body. The surface layer is an integral object of inorganic oxide formed of inorganic oxide. Examples of an inorganic element of the inorganic oxide include silicon, zirconium, titanium, and aluminum. The inorganic element is preferably silicon from viewpoints that handling of a precursor of a surface layer is comparatively easy and a polymerization reaction of the precursor by hydrolysis is easily controlled in manufacturing the surface layer by a sol-gel method described later.

The surface layer contains a black titanium compound dispersed therein. The black titanium compound is a titanium compound having valency of less than four. This titanium compound exhibits black or a dark color close to black. The black titanium compound may be formed of one kind or more, and examples thereof include trivalent titanium and low-order titanium oxide.

The trivalent titanium is a titanium-containing compound having a valence of 3, and examples thereof include an oxide such as $Ti_2O_3$ and a salt such as $TiCl_3$. The trivalent titanium is preferably an oxide such as $Ti_2O_3$ from a viewpoint of stability at ordinary temperature and in an ordinary atmosphere.

The low-order titanium oxide is a titanium oxide compound containing titanium having a valence of less than 4 and includes the above oxide of trivalent titanium. Examples of the low-order titanium oxide include a titanium compound having a composition of TiO, $Ti_2O_3$, $Ti_3O_5$, $Ti_4O_7$, or $Ti_nO_{2n-1}$. The low-order titanium oxide may be constituted as a composition of a plurality of kinds of titanium oxides. For example, "$Ti_2O_3$" may contain $TiO_2$ and TiO in an equimolar amount, and "$Ti_3O_5$" may contain $TiO_2$ and $Ti_2O_3$ in an equimolar amount or may contain two molar equivalents of $TiO_2$ and one molar equivalent of TiO. The low-order titanium oxide may contain a tetravalent titanium compound within a range where the total valence is less than 4.

The black titanium compound can be manufactured by a known method, for example, by a method for reducing titanium oxide using various reducing agents (hydrogen, ammonia, carbon black, titanium metal, or the like) or a synthesis method with a microwave as described in Non-Patent Literature "Synthesis of Ti4O7 Nanoparticles by Carbothermal Reduction Using Microwave Rapid Heating (Catalysts 2017, 7, 65-)", or can be obtained as a commercially available product. Examples of the commercially available product include "Titanium black" (manufactured by Mitsubishi Material Electronic Chemical Co., Ltd.) and "Tilack D" (registered trademark manufactured by Ako Kasei Co., Ltd.).

The black titanium compound exhibits black or a dark color as described above. Therefore, it can be confirmed that the black titanium compound has desired performance from the degree of blackness thereof. The degree of blackness of the black titanium compound is preferably 40 or less, more preferably 7 to 22, and particularly preferably 8 to 16 in terms of an L value. If the L value is too large, electric resistance of the black titanium compound is high, and therefore conductivity of a surface layer may be locally non-uniform. If the degree of blackness is high, that is, if the L value is small, polymerization may hardly occur in a case where polymerization of the surface layer is performed by irradiation with an ultraviolet ray.

If the black titanium compound contains a nitrogen atom, absorption of light having a wavelength in an ultraviolet region and the vicinity thereof tends to be strong. As a result, in a case where a polymerization reaction of a polymerizable functional group occurs in formation of a surface layer, the polymerizable functional group easily remains in the surface layer, or a larger amount of polymerization initiator may be required. The content of nitrogen atoms in the black titanium compound is preferably small, and it is more preferable for the black titanium compound to contain no nitrogen atom from such a viewpoint. The nitrogen atoms in the black titanium compound can be mixed into the black titanium compound, for example, in manufacturing the black titanium compound (for example, in manufacture the black titanium compound using ammonia as a reducing agent).

In synthesis of the black titanium compound by reduction of $TiO_2$, it is clear that coloration occurs strongly and black or a dark color is exhibited in a case where reduction is performed such that an oxide of a titanium ion having a valence of less than 4 such as $Ti_4O_7$, $Ti_3O_5$, or $Ti_2O_3$ is contained. An L value in this case is usually 8 to 16, and specific resistance of the powder is usually 0.1 to 3000 Ωcm.

However, in a case where reduction is further advanced to TiO, the material does not become darker anymore, and the L value rather increases to 9 to 21 in general. The specific resistance of the powder at this time is 0.001 to 0.1.

As described above, the L value does not become unlimitedly small depending on the degree of reduction, and therefore it is particularly difficult to set the L value to 7 or less.

Regarding the electric resistance, it is possible to reduce the resistance by increasing the degree of reduction. In a case of using a black titanium compound having low resistance, by reducing a volume blending ratio of the black titanium compound in the base layer, a design satisfying resistance conditions as a transfer belt is possible. However, in a case where the volume blending ratio is small, blending unevenness tends to occur significantly. When blending unevenness occurs, unevenness in electric resistance may occur, and therefore image defects (density unevenness) may occur due to occurrence of unevenness in transfer current. That is, it is difficult to design manufacturing conditions for preventing image defects. In a case of a design that increases the above volume blending ratio and accepts a slight decrease in electric resistance, it is difficult to maintain charging of a toner, and a problem such as reduction in image density may occur.

In consideration of achieving both a design of the electric resistance and a design of the manufacturing conditions for the above reasons, a design in which a black titanium compound having appropriate specific resistance is blended in a volume blending ratio of 1% or more is desirable. The L value satisfying this ratio is generally 8 to 16, and the specific resistance of a powder of the black titanium compound is generally 0.1 to 3000 acm.

The L value can be obtained by covering a part of a sample plate with a powder to be detected and measuring brightness of the covered portion with a spectrocolorimeter. The L value can be increased or decreased by further reducing or heating the black titanium compound.

In the powdery black titanium compound, a peak derived from $Ti^{3+}$ or the like can be detected by X-ray high-potential spectroscopy (ESCA or XPS). Alternatively, in a case of $Ti_nO_{2n-1}$ (n=3 to 9), a crystal pattern derived from low-order titanium oxide having a Magneli phase is known, and therefore detection can be performed by X-ray diffraction analysis. $Ti^{3+}$ or the like can be detected similarly by X-ray absorption fine structure analysis (XAFS).

In addition, the black titanium compound is oxidized by heating and transformed into white titanium oxide. Therefore, weight increased by oxidation of the black titanium compound to the white titanium oxide is detected by thermogravimetric analysis (TG), and a change in color from black to white is also confirmed. It can be confirmed that the powder in the surface layer is a black titanium compound also by such a method.

Note that the black titanium compound can be taken out from the surface layer by a known method for taking out only a filler made of a metal inorganic oxide from a surface layer made of an acrylic resin, for example, by a method for decomposing a resin constituting the surface layer using an acidic or basic catalyst to take out the filler from the surface layer.

Note that the black titanium compound is oxidized and transformed into white titanium oxide when a certain degree of heat, for example, heat of higher than 300° C., is applied thereto, or when the black titanium compound is irradiated with laser (for example, YAG laser) light having a wavelength in a visible region to a near-infrared region. Therefore, in a case where it is clear that the black titanium compound contains a Ti element, the presence thereof can be confirmed by the above simple method. The presence or absence of the titanium element can be confirmed by dissolving all of the filler in the surface layer in a solution of a hydrofluoric acid-containing acid and analyzing the obtained solution by, for example, high frequency inductively coupled plasma emission spectroscopy (ICP).

The black titanium compound has a particle diameter preferably of 5 to 250 nm, more preferably of 10 to 150 nm in terms of a number average particle diameter from a viewpoint of improving dispersibility in the surface layer of the black titanium compound. If the particle diameter is too large, the black titanium compound easily precipitates in a coating material for the surface layer or in a coating film thereof. If the particle diameter is too small, particularly in a case where a surface treatment is applied, dispersion failure may occur due to local non-uniformity in the surface treatment or defects, for example, the black titanium compound which has been insufficiently subjected to the surface treatment may precipitate. In either case, dispersibility may be insufficient. In addition, if the particle diameter is too large, the area of an interface per particle of the black titanium compound may be large, uniformity as viewed at a nano level may be insufficient, and it may be difficult to achieve a proper dispersion state of the black titanium compound in the surface layer.

The black titanium compound is preferable from a viewpoint of enhancing dispersion stability of the black titanium compound in manufacturing a coating liquid, application thereof, and thereby curing a coating film in manufacturing the surface layer described later. The surface treatment can be performed by a known method, and examples thereof include a surface treatment method using various coupling agents and a method for forming a layer covering a surface of the black titanium compound, such as a chemical vapor deposition (CVD) method, a metal organic chemical vapor deposition (MOCVD) method, or an atomic layer deposition (ALD) method.

If a coverage ratio of the surface of the black titanium compound with the surface treating agent is too low, it may be difficult to stabilize dispersion of a coating material for a surface layer in a solvent. If the coverage ratio is too high, when an integral object of inorganic oxide is formed in a process of manufacturing the surface layer, compatibility with the inorganic oxide generated may be reduced, and adhesive strength at an interface between the inorganic oxide and the black titanium compound may be insufficient. For example, in a case of using an alcohol-based solution as the solvent, the coverage ratio is preferably 20 to 75% of the surface area of the black titanium compound from such a viewpoint.

Incidentally, in a case where the surface of the black titanium compound is covered with an insulating inorganic component such as alumina or silica, if the coverage ratio is high, the electric characteristics of the surface layer of the black titanium compound may be insufficient. The coverage ratio is preferably determined appropriately depending on the type of the surface treatment agent within a range in which the effect of the present embodiment can be obtained.

The surface treatment method is preferably surface treatment with the coupling agent. The coupling agent is preferably a silane coupling agent from a viewpoint that the base layer is made of a resin, from a viewpoint that, in a case of manufacturing a surface layer by a sol-gel method described later, a process temperature of about 100° C. or higher is necessary and that a large change in the process temperature is suppressed, and from a viewpoint that surface treatment at a low temperature is possible.

The silane coupling agent preferably has a functional group having a bonding property to the precursor of the inorganic oxide from viewpoints of constructing a crosslinked structure derived from the silane coupling agent in the integral object of the inorganic oxide, reinforcing the skeleton of the integral object, relaxing a stress in the surface layer, and improving durability against cracking. The above bonding property may be a property of forming a bond by a chemical reaction or a property of forming a noncovalent interaction such as a hydrogen bond.

The functional group can be appropriately determined according to the type of the precursor or conditions such as a method for manufacturing the surface layer with the precursor. Examples thereof include, for example, in a case where the surface layer is manufactured by a sol-gel method of an inorganic alkoxide, a functional group bonded to the precursor to form a crosslinked structure during a sol-gel reaction and a functional group exhibiting an affinity by interaction such as a hydrogen bond to an oxygen atom remaining as a result of the sol-gel reaction. More specifically, examples of the former include an ethylene oxide group, and examples of the latter include an amino group.

In addition, the silane coupling agent may further contain an organic group that bonds silicon to the functional group. Inclusion of such an organic group is preferable from a viewpoint of enhancing dispersibility of the black titanium compound in a case where a coating material at the time of manufacturing the surface layer contains an organic solvent.

In the surface layer manufactured using the black titanium compound surface-treated with the silane coupling agent, the black titanium compound is bonded to the inorganic oxide via a residue of the silane coupling agent.

Examples of the silane coupling agent include compounds represented by the following S-1 to S-36.

S-1: $CH_2$=$CHSi(CH_3)(OCH_3)_2$
S-2: $CH_2$=$CHSi(OCH_3)_3$
S-3: $CH_2$=$CHSiCl_3$
S-4: $CH_2$=$CHCOO(CH_2)_2Si(CH_3)(OCH_3)_2$
S-5: $CH_2$=$CHCOO(CH_2)_2Si(OCH_3)_3$
S-6: $CH_2$=$CHCOO(CH_2)_2Si(OC_2H_5)(OCH_3)_2$
S-7: $CH_2$=$CHCOO(CH_2)_3Si(OCH_3)_3$
S-8: $CH_2$=$CHCOO(CH_2)_2Si(CH_3)Cl_2$
S-9: $CH_2$=$CHCOO(CH_2)_2SiCl_3$
S-10: $CH_2$=$CHCOO(CH_2)_3Si(CH_3)Cl_2$
S-11: $CH_2$=$CHCOO(CH_2)_3SiCl_3$
S-12: $CH_2$=$C(CH_3)COO(CH_2)_2Si(CH_3)(OCH_3)_2$
S-13: $CH_2$=$C(CH_3)COO(CH_2)_2Si(OCH_3)_3$
S-14: $CH_2$=$C(CH_3)COO(CH_2)_3Si(CH_3)(OCH_3)_2$
S-15: $CH_2$=$C(CH_3)COO(CH_2)_3Si(OCH_3)_3$
S-16: $CH_2$=$C(CH_3)COO(CH_2)_2Si(CH_3)C_{12}$
S-17: $CH_2$=$C(CH_3)COO(CH_2)_2SiC_{13}$
S-18: $CH_2$=$C(CH_3)COO(CH_2)_3Si(CH_3)C_{12}$
S-19: $CH_2$=$C(CH_3)COO(CH_2)_3SiCl_3$
S-20: $CH_2$=$CHSi(C_2H_5)(OCH_3)_2$
S-21: $CH_2$=$C(CH_3)Si(OCH_3)_3$
S-22: $CH_2$=$C(CH_3)Si(OC_2H_5)_3$
S-23: $CH_2$=$CHSi(OC_2H_5)_3$
S-24: $CH_2$=$C(CH_3)Si(CH_3)(OCH_3)_2$
S-25: $CH_2$=$CHSi(CH_3)Cl_2$
S-26: $CH_2$=$CHCOOSi(OCH_3)_3$
S-27: $CH_2$=$CHCOOSi(OC_2H_5)_3$
S-28: $CH_2$=$C(CH_3)COOSi(OCH_3)_3$
S-29: $CH_2$=$C(CH_3)COOSi(OC_2H_5)_3$
S-30: $CH_2$=$C(CH_3)COO(CH_2)_3Si(OC_2H_5)_3$

[Chemical formula 1]

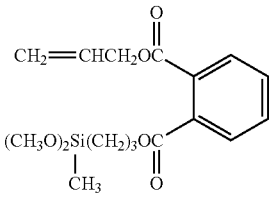
(S-31)

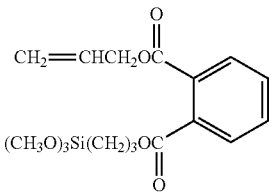
(S-32)

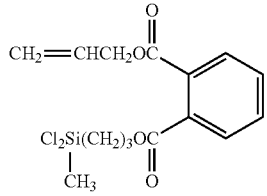
(S-33)

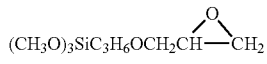
(S-34)

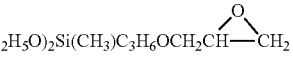
(S-35)

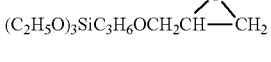
(S-36)

The surface layer may further contain other components within a range where the effect of the present embodiment can be obtained. The content of the other components in the surface layer can be appropriately determined within a range where both the effect of the present embodiment and an effect of the components can be obtained and is for example, about several % by mass Examples of the other components include a filler other than the black titanium compound and an antioxidant. Examples of the filler include conductive particles and white titanium oxide.

The conductive particles are, for example, metal oxide particles having conductivity and can be appropriately selected from known particles because of being added to a layer having conductivity in constituent members of an image forming device. The conductive particles may be formed of one kind or more, and examples thereof include indium-tin composite oxide (ITO) particles, tin oxide particles, white titanium oxide nanoparticles, and zinc oxide particles. Among these particles, tin oxide particles or white titanium oxide nanoparticles are preferable.

Roughly speaking, the white titanium oxide is titanium oxide not included in the black titanium compound and is generally white (L value is 70 or more) and has lower electric conductivity than the black titanium compound although depending on a particle diameter and a crystal shape.

Note that the black titanium compound can be obtained by reducing the white titanium oxide. For example, white titanium oxide having a small degree of reduction generally has a color tone between white and black and has specific resistance of about $10^{3.5}$ to $10^6$ Ωcm as conductivity, that is, has slightly higher electric conductivity than white titanium oxide which has not been reduced.

Titanium oxide having a higher degree of reduction (for example, $Ti_3O_5$ or $Ti_4O_7$) generally has a color tone of black, an L value of 5 to 20, and specific resistance of about $10^{-1}$ to $10^{3.5}$ Ωcm as conductivity, corresponding to the black titanium compound.

Titanium oxide having a still higher degree of reduction (for example, having a molar ratio of Ti of 1 to 1.5 with respect to oxygen atoms) generally has a lower degree of blackness than the above titanium oxide having a higher degree of reduction, an L value of about 9 to 21, and specific resistance of about $10^1$ to $10^{-3}$Ωcm as conductivity, corresponding to the black titanium compound. However, a difference in the degree of blackness between this titanium oxide and the above titanium oxide having a higher degree of reduction is a small difference that is hardly recognized usually in a mixed powder.

Any of the above fillers may be surface-treated with a surface treatment agent. This surface treatment can be performed in a similar manner to that described above for the black titanium compound.

The conductive particles such as the nanoparticles of the white titanium oxide have high uniformity in conductivity. Therefore, local unevenness in conductivity hardly occurs, and image unevenness caused thereby hardly occurs. The conductive particles also exhibit a function of enhancing mechanical strength of the surface layer. The content of an optionally blended filler (inorganic substance) such as the conductive particles is preferably 5 to 40 parts by volume, and more preferably 10 to 30 parts by volume with respect to 100 parts by volume of an inorganic dispersoid in the surface layer. If the content of the inorganic substance is too small, an effect of improving the strength of the surface layer may be insufficient, and this may cause non-uniformity of a conductive path. If the content is too large, a specific conductive path is easily formed by direct contact between the inorganic substances, and as a result, local image unevenness may occur.

The number average primary particle diameter of the inorganic substance is preferably 1 to 300 nm, and more preferably 3 to 100 nm from viewpoints of enhancing abrasion resistance of the surface layer and enhancing dispersibility of the inorganic substance in the surface layer.

Note that components contained in the surface layer can be identified and quantified by a known method. For example, an organic component can be analyzed by pyrolysis GC-MS, GC-MS of a decomposition product obtained after hydrolysis of an ester bond, or the like. In such an analysis, it is also possible to utilize comparison with an analysis result of a standard cured product.

The particle diameter of a particle in the surface layer can also be determined by a known method. For example, the number average primary particle diameter thereof can be calculated by taking a magnified photograph of 10,000 times with a scanning electron microscope (JEOL Ltd.), randomly taking in three hundred particles other than an aggregated particle with a scanner, and analyzing the obtained photographic image using an automatic image processing analyzer (LUZEX AP; Nireco Co., Ltd.) software version Ver. 1.32. Note that the particle diameter can be adjusted by classifying these particles or mixing classified products.

If the content of the black titanium compound in the surface layer is small, a desired effect decreases. If the content is too large, generation of inorganic oxide constituting the surface layer may be inhibited. The content is preferably 0.5 to 20% by volume, and more preferably 1 to 10% by volume from these viewpoints.

If the thickness of the surface layer is too thin, uniformity in the composition of the surface layer may be insufficient. The thickness of the surface layer is preferably 5 times or more the particle diameter of the black titanium compound or another filler in the surface layer, and more preferably 10 times or more, for example, preferably 0.2 μm or more, and more preferably 0.4 μm or more from such a viewpoint. If the thickness of the surface layer is too thick, an effect of improving durability and image quality may reach the ceiling to cause cracking due to a residual internal stress during a curing reaction. Therefore, the thickness is preferably 8.0 μm or less, and more preferably 5.0 μm or less from such a viewpoint.

The intermediate transfer body may have a configuration in which the surface layer is directly disposed on the base layer or may further have another configuration within a range where the effect of the present embodiment can be obtained. For example, the intermediate transfer body may further include an elastic layer between the base layer and the surface layer in order to improve transferability. Inclusion of such an elastic layer is advantageous from a viewpoint of enhancing the transferability in secondary transfer onto various recording media including rough paper, and can further increase a value of the intermediate transfer body.

The intermediate transfer body can be manufactured using a known method. For example, the intermediate transfer body can be manufactured by a method including a first step of generating the inorganic oxide from the precursor in a dispersion containing the precursor of the inorganic oxide and the black titanium compound, a second step of forming a coating film of the coating material in which the inorganic oxide has been generated on the base layer, and a third step of drying and solidifying the coating film of the coating material to manufacture the surface layer.

The dispersion contains the precursor and the black titanium compound, and usually contains a dispersion medium. The coating material contains the inorganic oxide generated from the precursor and the black titanium compound, and usually contains a dispersion medium.

The precursor is a material of the inorganic oxide. The precursor only needs to be able to construct an integral object of inorganic oxide, for example, by heating, or only needs to be able to form a sol dispersion by a method such as hydrolysis and then to form a gel. Examples of the precursor include an organometallic chelate compound, an organometallic acylate, an oligomer of an organometallic compound, and an inorganic alkoxide. The precursor is preferably an organometallic acylate or an oligomer of an organometallic compound from a viewpoint of stability of a coating material, or is preferably an inorganic alkoxide from viewpoints of ease of a polymerization reaction of the precursor, ease of availability, and suppressing occurrence of a side effect such as an image memory in a polymerization reaction at a low temperature.

Examples of an inorganic element of the inorganic alkoxide include silicon, zirconium, titanium, and aluminum. An alkoxy group of the inorganic alkoxide may be one kind or more, and examples thereof include a linear alkoxy group having 1 to 3 carbon atoms, such as methoxy, ethoxy, or n-propoxy. Examples of such an inorganic alkoxide include tetraalkoxysilane, zirconium tetraalkoxide, titanium tetraalkoxide, and aluminum trialkoxide.

The dispersion medium only needs to be a liquid in which the precursor, the inorganic oxide, and the black titanium compound can be dispersed, and examples thereof include water, a lower alcohol, an aprotic organic solvent, and a mixture thereof. The dispersion medium is preferably a lower alcohol or a liquid containing the lower alcohol as a main component from viewpoints of applicability of the coating material (for example, wettability to the base layer), the rate of progress of hydrolysis in a sol-gel method, and suppressing phase separation during hydrolysis in the sol-gel method.

The lower alcohol is preferably an alcohol having 1 to 3 carbon atoms, and examples thereof include methanol, ethanol, 2-propanol, and 1-propanol. The dispersion medium may further contain another component, for example, a volatile secondary component for forming a sol, and examples of the other component include hydrogen chloride, formic acid, acetic acid, carbonic acid, ammonia, methylamine, ethylamine, and salts obtained by blending these acids and bases.

The inorganic oxide can be generated in the first step by a method for oxidizing an inorganic element of the precursor. For example, in a case where the precursor is an inorganic alkoxide, the inorganic oxide can be generated by hydrolysis and dehydration condensation of the precursor, and is preferably generated in the presence of an acid or an alkali as a catalyst.

The second step can be performed by applying a coating material containing the inorganic oxide generated in the first step onto a surface of the base layer or another layer formed thereon. The method for applying the coating material can be appropriately selected from known applying methods.

The third step can be performed by gelling a sol in the coating film of the coating material. In this manner, the surface layer can be manufactured by a sol-gel method.

For example, the surface layer can be manufactured by preparing a colloidal solution of a sol of inorganic oxide from a dispersion of the precursor (for example, inorganic alkoxide) and the black titanium compound, applying the colloidal solution as a coating material onto the base layer, and drying and solidifying the formed coating film. Such a manufacturing method is preferable from viewpoints of suppressing cracking of the surface layer due to volatilization of a dispersion medium at the time of drying and solidifying the coating film, and constructing a three-dimensional bond of the inorganic oxide in the surface layer to enhance durability against cracking.

In addition to the above sol-gel method, for example, the third step can be performed by a liquid phase deposition method in which boric acid is added to a solution obtained by dissolving and saturating silica in a solution of hydrofluorosilicic acid to precipitate inorganic silica on a substrate to form a thin film.

In a high temperature environment, the black titanium compound is oxidized and converted into ordinary titanium oxide (oxide of tetravalent titanium). If the process temperature in manufacturing the surface layer is high, a residual stress of the surface layer may increase due to expansion due to heat and contraction due to subsequent cooling. Therefore, in the above manufacturing method, the surface layer is preferably manufactured in an environment of 200° C. or lower, more preferably in an environment of 150° C. or lower.

A change of a black titanium compound to white titanium oxide in a high temperature environment does not substantially occur in a short time of about several minutes although depending on the temperature. By being left for a long time in a temperature environment around 200° C. or by passing through an environment of a sufficiently high temperature of 300° C. or higher, the above characteristics may be deteriorated. Therefore, the above manufacturing method may include a manufacturing environment of 200° C. or higher within a range where the effect of the present embodiment can be obtained. Note that the above change can be detected by an analysis method capable of distinguishing white titanium oxide and a black titanium compound from each other.

The above manufacturing method may further include a step other than the step of manufacturing the surface layer within a range where the effect of the present embodiment can be obtained. Examples of such another step include a step of manufacturing the base layer prior to manufacturing the surface layer. The step of manufacturing the base layer can be performed by a known method as described above.

Incidentally, the intermediate transfer body includes the base layer made of a resin, and therefore it is difficult to adopt, as the method for manufacturing the surface layer, a method of 500° C. or higher (perhaps 1000° C. or higher) like a method for directly forming molten glass. It is possible to detect a bond derived from "M-O-M" in inorganic oxide by an analysis method that can detect a bonding state of the inorganic oxide, such as ESCA. In addition, it is possible to detect a dispersion medium remaining in the surface layer by a known device analysis method such as GC-MS. It is possible to confirm that the method for manufacturing the surface layer includes a sol-gel method from detection results thereof.

The method for manufacturing the surface layer may be a method other than the method using the sol-gel method within a range where the effect of the present embodiment can be obtained. For example, the method for manufacturing the surface layer may be a method for manufacturing a thin film containing inorganic oxide other than titanium oxide and ordinary titanium oxide by an atmospheric pressure CVD method, and then reducing the titanium oxide in the thin film to generate a black titanium compound in the thin film. An intermediate layer may be disposed between the surface layer and the base layer within a range where the effect of the present embodiment can be obtained or in order to further enhance the effect of the present embodiment.

The intermediate transfer body can be used as an intermediate transfer body in an electrophotographic image forming device. The image forming device can be configured and can be used for image formation in a similar manner to a known image forming device except that the intermediate transfer body of the present embodiment is used for the intermediate transfer body.

Hereinafter, an image forming device according to an embodiment of the present invention will be described with reference to FIG. 1. FIG. 1 is a view schematically illustrating an example of the configuration of the image forming device of the present embodiment. As illustrated in FIG. 1, an image forming device 1 includes an image processor 10, a transferer 20, a sheet feeder 30, a fixer 40, and a controller 45.

The image processor 10 includes image forming units 10Y, 10M, 10C, and 10K corresponding to developing colors of yellow (Y), magenta (M), cyan (C), and black (K), respectively. The image forming unit 10Y includes a photosensitive drum 11 as an electrostatic latent image carrier, a charger 12 that charges a surface of the photosensitive drum 11, an exposurer 13 that forms an electrostatic latent image on the charged surface of the photosensitive drum 11, a developer 14 that supplies toner particles to the surface of the photosensitive drum 11 on which an electrostatic latent image is formed to develop the electrostatic latent image, a primary transfer roller 15 that transfers the formed toner image from the surface of the photosensitive drum 11 onto an intermediate transfer body, and a cleaner 16 that removes the toner particles remaining on the surface of the photosensitive drum 11 from the surface after the transfer. In FIG. 1, the reference numerals of components of the other image forming units 10M, 10C, and 10K are omitted. However, as illustrated in FIG. 1, each of these image forming units also has a similar configuration to the image forming unit 10Y.

The charger 12 is, for example, a contact charging device that comes into contact with the photosensitive drum 11 to charge the photosensitive drum 11. The exposurer 13 is, for example, a device that emits a laser beam corresponding to an image to be formed. The developer 14 is, for example, a developing device for a two-component developing agent. The cleaner 16 is, for example, an elastic blade made of rubber.

The transferer 20 includes an intermediate transfer body 21 which is an endless belt disposed so as to include the primary transfer roller 15 in an endless track, a driving roller 24 and a driven roller 25 that stretch the intermediate transfer body 21, a density detection sensor 23 that detects the image density of a toner image primarily transferred onto the intermediate transfer body 21, a secondary transfer roller 22 disposed so as to face the driving roller 24 via the intermediate transfer belt 12, and a cleaning blade 26 that comes into contact with a surface of the intermediate transfer body 21 stretched by the driven roller 25 to remove toner particles remaining on the surface.

The intermediate transfer body 21 is a seamless belt (endless belt) and is manufactured by injection molding or centrifugal molding of a resin material so as to have a desired peripheral length determined by a design. The intermediate transfer body 21 corresponds to the intermediate transfer body in the present embodiment. The density detection sensor 23 is, for example, a reflection type photoelectric sensor. The cleaning blade 26 is, for example, an elastic blade made of rubber.

Figure 2A:
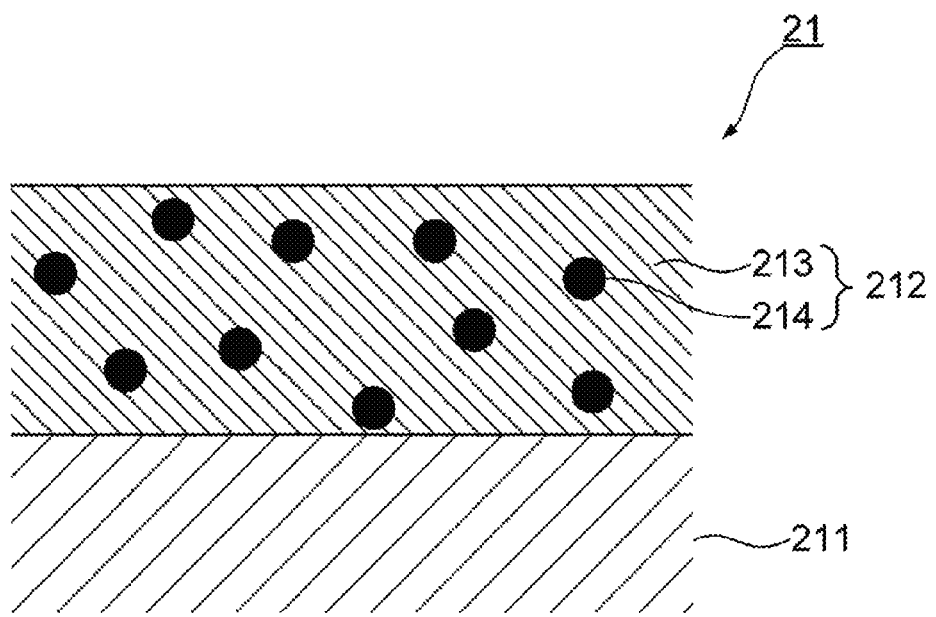
FIG. 2A is a view schematically illustrating an example of a cross section of a main part of an intermediate transfer body according to an embodiment of the present invention.
Figure 2B:
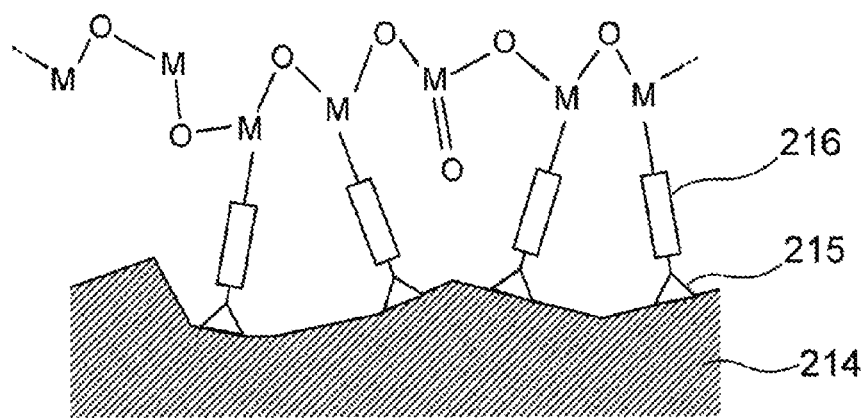
FIG. 2B is an enlarged view schematically illustrating the main part of the intermediate transfer body.

FIG. 2A is a view schematically illustrating an example of a cross section of a main part of the intermediate transfer body 21, and FIG. 2B is an enlarged view schematically illustrating the main part of the intermediate transfer body 21. As illustrated in FIG. 2A, the intermediate transfer body 21 includes a base layer 211 and a surface layer 212 disposed thereon. The base layer 211 is, for example, an endless belt made of polyimide. The surface layer 212 is disposed on an outer peripheral surface of the endless belt and includes inorganic oxide 213. The inorganic oxide 213 is, for example, silica and forms an integrated three-dimensional crosslinked structure. In the surface layer 212, a black titanium compound 214 is dispersed.

As illustrated in FIG. 2B, the black titanium compound 214 has a silane group 215 bonded to a surface of the black titanium compound 214 and a divalent organic group 216 bonded to the silane group 215 and bonded to an inorganic element (M) of an inorganic compound. The organic group 216 is, for example, a group having a structure after ring opening of a lower alkylene group (for example, methylene, ethylene, or propylene) and an epoxy group bonded thereto. The silane group 215 and the organic group 216 are residues of a silane coupling agent, for example, having a glycidyl group, in the black titanium compound surface-treated with the silane coupling agent. In this manner, the black titanium compound 124 is chemically bonded to the inorganic oxide 213 constituting a three-dimensional crosslinked structure.

The sheet feeder 30 includes a conveyance path 31 that is housed in a sheet feeding cassette and conveys a sheet S as a recording medium to the secondary transfer roller 22 and the fixer 40, a sheet discharging roller 32 that discharges the fixed sheet S out of the image forming device 1, and a sheet discharging tray 33 that houses the sheet S discharged out of the image forming device 1.

The fixer 40 includes a heating member and a pressing member that heat and press an unfixed toner image carried on a surface of the sheet S onto a surface of the sheet S by secondary transfer.

The controller 45 is connected to an external terminal device (not illustrated) via a network (for example, LAN). The image forming device 1 includes an operation panel 35.

In the image forming device 1, the controller 45 selects a color print or monochrome print based on a print job accepted from an external terminal device or accepted from the operation panel 35.

The photosensitive drum 11 rotates in a direction indicated by the arrow, and the charger 12 charges a peripheral surface of the photosensitive drum 11. The exposurer 13 exposes the charged photosensitive drum 11 to laser light and scans the photosensitive drum 11 to form an electrostatic latent image on the photosensitive drum 11. The developer 14 houses a two-component developer containing toner particles therein and develops an electrostatic latent image on the photosensitive drum 11 with the toner particles. As a result, for example, in the image forming unit 10Y, a yellow toner image is formed on the photosensitive drum 11, and a toner image is thereby carried on the photosensitive drum 11.

The intermediate transfer body 21 is stretched by the driving roller 24 and the driven roller 25 and circulates and travels in a direction indicated by the arrow. The yellow toner image on the photosensitive drum 11 is transferred onto the intermediate transfer body 21 by an electrostatic action by the primary transfer roller 15. In this manner, the toner image is primarily transferred onto the intermediate transfer body 12. A residual toner remaining on the photosensitive drum 11 after the primary transfer is removed from the photosensitive drum 11 by the cleaner 16. The image density of the toner image formed on the intermediate transfer body 21 is detected by the density detection sensor 23.

In a case where color printing is performed, each of the image forming units 10M, 10C, and 10K forms a toner image of a color corresponding thereto on the photosensitive drum 11, and the toner image of each of the colors thus formed is transferred onto the intermediate transfer body 21. This image forming operation of each color is performed in such a manner that the timing is shifted from an upstream side toward a downstream side in a movement direction of the intermediate transfer body 21 such that the toner images of the respective colors overlap with one another to be transferred onto the same position of the traveling intermediate transfer body 21.

Meanwhile, the sheet feeder 30 feeds the sheets S one by one from a sheet feeding cassette in accordance with the above image forming timing and conveys the sheets S on the conveyance path 31 toward the secondary transfer roller 22. When the sheet S conveyed to the secondary transfer roller 22 passes between the secondary transfer roller 22 and the intermediate transfer body 21, a toner image formed on the intermediate transfer body 21 is collectively transferred onto the sheet S by an electrostatic action of the secondary transfer roller 22. That is, the toner image is secondarily transferred from the intermediate transfer body 21 onto the sheet S.

Note that toner particles remaining on the intermediate transfer body 21 after the secondary transfer are removed from the intermediate transfer body 21 by the cleaning blade 26.

The sheet S carrying the secondarily transferred toner image is conveyed to the fixer 40 and heated and pressed in the fixer 40. As a result, toner particles on a surface of the sheet S are fused and fixed to the surface. In this manner, the unfixed toner image is fixed to the sheet S. The sheet S having the fixed toner image is discharged onto the sheet discharging tray 33 by the sheet discharging roller 32. In this manner, a desired toner image is formed on the sheet S.

Incidentally, in a case where monochrome printing, for example, black printing is performed, a desired black toner image is formed on the sheet S by a similar operation to the above except that only the image forming unit 10K is driven.

The image forming device 1 has excellent mechanical durability and electrical durability because of including the intermediate transfer body 21, and as a result, can form a high-quality image in which image defects due to transfer failure are suppressed over a long period of time. Reasons thereof will be described below.

Generally, in the black titanium compound, a molar ratio between oxygen atoms and titanium atoms cannot be represented by a simple integer ratio. That is, the black titanium compound is generally formed of an assembly of complicated microcrystals in a state of primary particles. In this manner, the black titanium compound has an amorphous structure as an internal structure thereof. Therefore, an internal stress of the surface layer can be relaxed, cracking of the surface layer can be suppressed, and mechanical strength of the surface layer can be maintained over a long period of time. Particularly, in a surface layer manufactured by using a sol-gel method, crystallinity of inorganic oxide is not high, and therefore such a surface layer is more preferable from a viewpoint of relaxing the stress.

In addition, each of trivalent titanium and oxygen-deficient low-order titanium oxide contained in the black titanium compound has a larger content of electrons contributing to conduction than $TiO_2$. Therefore, a powder of the black titanium compound has lower electric resistance than $TiO_2$. In this manner, the black titanium compound has moderate conductivity. Therefore, by uniformly dispersing the black titanium compound in the surface layer at a desired density, the surface layer having locally uniform electric resistance is formed. Therefore, even if unevenness occurs on a surface of the surface layer, it is possible to reduce a fluctuation range of the electric resistance, to avoid electric field concentration due to the occurrence of the unevenness, and to prevent deterioration of the surface layer due to local conduction.

Furthermore, as described above, in the black titanium compound, a molar ratio between oxygen atoms and titanium atoms cannot be represented by a simple integer ratio, and a ratio of the oxygen atoms is slightly smaller. Therefore, the black titanium compound has a less amount of water coordination and is easily dispersed in an organic solvent more uniformly than ordinary titanium oxide ($TiO_2$). In this manner, the black titanium compound is advantageous for uniform dispersion, and therefore suppresses generation of local defects in the surface layer immediately after manufacture both mechanically and electrically.

Incidentally, as for the electric characteristics in the surface layer, it is possible to easily adjust the electric resistance of the surface layer by further dispersing the black titanium compound in another filler surface layer having higher crystallinity than a usual filler.

In the surface layer manufactured using a sol-gel method, the inorganic oxide is dried and solidified via a semi-cured sol. The sol contains a polar functional group in a large amount, and therefore easily interacts with a surface-untreated portion (untreated portion) of the black titanium compound. Particularly, the black titanium compound includes an amorphous structure as described above. Therefore, even if the untreated portion randomly exists on a surface of the black titanium compound and the interaction does not occur in a part of the untreated portion, the other parts of the untreated portion exhibit the above interaction at several sites averagely. Therefore, this is advantageous for strengthening an interface between the inorganic oxide and the black titanium compound in the surface layer.

Incidentally, as for the electric characteristics in the surface layer, it is possible to easily adjust the electric resistance of the surface layer by further dispersing the black titanium compound in another filler surface layer having higher crystallinity than a usual filler.

The black titanium compound has strong absorption of not only visible light but also near infrared light. Therefore, when the toner density on the intermediate transfer body 21 is measured using an optical sensor having sensitivity for visible to near infrared light (wavelength 600 to 1000 nm) as the density detection sensor 23, an influence of reflected light on a surface of the base layer is reduced, and detection by the optical sensor is also stabilized.

The black titanium compound contains an oxygen atom, and therefore can be surface-treated with a known surface treatment agent such as a silane coupling agent. The surface-treated black titanium compound is advantageous for maintaining a uniformly dispersed state of the black titanium compound in a coating material to a surface layer in manufacturing the surface layer. Furthermore, by the surface-treated filler in the surface layer containing the black titanium compound, an organic functional group is disposed on a surface of the filler, and as a result, an appropriate stress relaxing effect against various stresses is reinforced. Therefore, an effect of suppressing mechanical deterioration can be further enhanced, and as a result, an effect of suppressing electrical deterioration can be further enhanced It is relatively easy to obtain alkoxides of silicon, zirconium, aluminum, and titanium, and a film can be formed (a surface layer can be manufactured) at a process temperature of 200° C. or lower by a sol-gel method. Therefore, transformation of the base layer and the black titanium compound is suppressed. By combining an applying method with curing, the film can be easily formed.

As is apparent from the above description, the intermediate transfer body of the present embodiment includes a base layer made of a resin and a surface layer disposed on the base layer. The surface layer is an integral object of inorganic oxide and contains a black titanium compound dispersed in the surface layer. Therefore, the intermediate transfer body has mechanical durability and stable electric characteristics over a long period of time.

It is more effective for the black titanium compound to contain one or both of trivalent titanium and low-order titanium oxide from a viewpoint of improving stability of the black titanium compound.

In addition, it is more effective for the black titanium compound to be bonded to the inorganic oxide via a residue of a silane coupling agent from a viewpoint of relaxing an internal stress of the surface layer to prevent cracking of the surface layer.

In addition, it is more effective for the black titanium compound to contain no nitrogen atom because of the following reason. That is, titanium oxide containing a nitrogen atom inevitably contains a titanium nitride component also on an outermost surface. However, as the ratio of the titanium nitride component increases, the number of functional groups contributing to a reaction of a silane coupling agent decreases. Therefore, reactivity of the silane coupling agent decreases to make dispersion difficult. In a case where dispersion failure occurs significantly, poorly dispersed aggregates may affect an image, or cracking may occur in the surface layer due to the aggregates as a starting point. It is more effective for the black titanium compound to contain no nitrogen atom from a viewpoint of suppressing image failure and breakage of the surface layer due to such dispersion failure.

It is more effective for the inorganic oxide to be formed of one or more elements selected from the group consisting of silicon, zirconium, aluminum, and titanium from viewpoints of facilitating manufacture of the surface layer and suppressing thermal denaturation of the base layer and the black titanium compound.

It is more effective for the resin of the base layer to contain polyimide, polyimide imide, polyethylene naphthalate, or polyether ether ketone from a viewpoint of enhancing durability and heat resistance of the base layer.

It is more effective for the thickness of the surface layer to be 0.4 to 8.0 μm from viewpoints of suppressing cracking due to a residual stress of the surface layer and enhancing dispersibility of the black titanium compound in the surface layer.

A method for manufacturing the intermediate transfer body includes a step of generating the inorganic oxide from the precursor in a dispersion containing the precursor of the inorganic oxide and the black titanium compound, a step of forming a coating film of the coating material in which the inorganic oxide has been generated on the base layer, and a step of drying and solidifying the coating film of the coating material to manufacture the surface layer. Therefore, it is possible to provide the intermediate transfer body having mechanical durability and stable electric characteristics over a long period of time.

In the above manufacturing method, it is more effective to use an inorganic alkoxide as the precursor, to generate the inorganic oxide by a sol-gel method, and to manufacture the surface layer from viewpoints of suppressing thermal denaturation of the black titanium compound and manufacturing the surface layer in which an internal stress is more easily relaxed.

The image forming device includes the intermediate transfer body. Therefore, the image forming device can form a high-quality image in which image defects due to transfer failure are suppressed over a long period of time by an electrophotographic method.

EXAMPLES

Hereinafter, the present invention will be specifically described with reference to Examples, but the present invention is not limited thereto.

[Manufacture of Base Layer 1]

To an N-methyl-2-pyrrolidone (NMP) solution of polyamide acid ("U-Varnish S" manufactured by Ube Industries, Ltd., solid content: 18% by mass) containing 3,3',4,4'-biphenyltetracarboxylic acid dianhydride (BPDA) and p-phenylenediamine (PDA), dry and oxidized carbon black ("SPECIAL BLACK 4" manufactured by Degussa, pH 3.0, volatile content: 14.0%) was added in an amount of 23 parts by mass with respect to 100 parts by mass of the polyimide-based resin solid content. The resulting mixture was divided into two parts. Subsequently, the two parts were caused to collide with each other to be mixed using a collision type dispersing machine "Geanus PY" (manufactured by Geanus) at a pressure of 200 MPa and a minimum area of 1.4 $mm^2$. Division and mixing were repeated in this manner six more times to obtain a polyamide acid solution containing carbon black.

The polyamide acid solution containing carbon black thus obtained was applied onto an inner peripheral surface of a cylindrical die using a dispenser at a thickness of 0.5 mm, and the die was rotated at 1,500 rpm for 15 minutes to manufacture a developing layer of the solution having a uniform thickness. While the die was further rotated at 250 rpm, hot air of 60° C. was applied to the die from an outside thereof for 30 minutes, and then the die was heated at 150° C. for 60 minutes. Subsequently, the temperature was raised to 360° C. at a rising rate of 2° C./min, and heating was further performed at 360° C. for 30 minutes to perform removal of a solvent, dehydration ring closure, removal of water generated at this time, and completion of an imide conversion reaction. Thereafter, the die was cooled to room temperature, and the formed belt made of a resin was peeled off from the inner peripheral surface of the die. In this manner, an endless belt-shaped base layer 1 made of PI and having a thickness of 100 μm, a peripheral length of 750 mm, and a width of 359 mm was manufactured.

[Manufacture of Base Layer 2]

963.86 g of polyamide imide varnish ("Vylomax (registered trademark) HR-11NN" manufactured by Toyobo Co., Ltd.) and 36.145 g of a carbon nanofiber dispersion ("AMC (registered trademark)" manufactured by Ube Industries, Ltd.) were mixed and defoamed with a rotation and revolution mixer ("AR-250" manufactured by Thinky Corporation) in several divided portions to manufacture a coating liquid. NMP was used as a solvent of the polyamide imide varnish. The contained polyamide imide resin had a weight average molecular weight of 72,000 and a number average molecular weight of 19,000. A dispersoid (carbon nanofibers) of the carbon nanofiber dispersion had a density of 5.0% by mass NMP was used as a dispersion medium. The carbon nanofibers had an average particle diameter of 11 nm.

The obtained coating liquid was applied onto an outer peripheral surface of a cylindrical die with a dispenser, and then the die was rotated to obtain a uniform coating film. Hot air of 60° C. was applied to the die from an outside thereof for 30 minutes. Subsequently, the die was heated at 150° C. for 60 minutes, and then fired at 250° C. for 60 minutes. Thereafter, the die was cooled to room temperature (25° C.)

at a rate of 2° C./min, and the formed belt made of a resin was peeled off from the die. In this manner, an endless belt-shaped base layer 2 made of PAI and having a thickness of 100 μm, a peripheral length of 750 mm, and a width of 359 mm was manufactured.

[Manufacture of Base Layer 3]

A composition containing the following components in the following amounts was thermally melted and kneaded using a twin-screw extruder (trade name: TEX 30a manufactured by Japan Steel Works, Ltd.) at 260 to 280° C. for 3 to 5 minutes of thermally melting and kneading timed to prepare a thermoplastic resin composition. The thermoplastic resin composition was pelletized, and the resulting pellet was dried at 140° C. for 6 hours.

Polyethylene naphthalate: 80 parts by mass
Polyether ester amide: 18 parts by mass
Potassium perfluorobutane sulfonate 2: parts by mass The "polyethylene naphthalate" is "TN-8050SC" manufactured by Teijin Chemicals Ltd. A melting temperature Tm thereof is 260° C., and an intrinsic viscosity thereof determined from a 0.5% by mass o-chlorophenol solution at 25° C. is 0.50 dl/g. The "polyether ester amide" is "Irgastat P20" manufactured by BASF. "Irgastat" is a registered trademark of BASF. A melting temperature Tm thereof is 180° C. The "potassium perfluorobutane sulfonate" is a surfactant "KFBS" manufactured by Mitsubishi Materials Corporation.

Subsequently, the pellet was put in an injection molding device (trade name: SE 180D, manufactured by Sumitomo Heavy Industries, Ltd.). By setting a cylinder setting temperature to 295° C., injection molding was performed in a die having a temperature adjusted to 30° C. to manufacture a preform. The obtained preform had a test tube shape having an outer diameter of 20 mm, an inner diameter of 18 mm and a length of 150 mm.

The preform was biaxially stretched using a biaxial stretching device. Before biaxial stretching, by setting the temperature of a non-contact type heater outside the preform to 500° C., the temperature of an outer surface of the preform was heated to 150° C., and by setting the temperature of a non-contact type heater inside the preform to 700° C., the temperature of an inner surface of the preform was heated to 165° C. Subsequently, the heated preform was disposed in a blow die where the die temperature was kept at 110° C. and stretched in an axial direction using a stretching bar. Simultaneously, air having a temperature adjusted to 23° C. was introduced into the preform from a blow-air injection portion, and the preform was stretched in a radial direction. In this manner, an endless belt-shaped base layer 3 made of PEN and having a thickness of 100 μm, a peripheral length of 750 mm, and a width of 359 mm was manufactured.

[Manufacture of Base Layer 4]

A composition containing the following components in the following amounts was thermally melted and kneaded using a twin-screw extruder (trade name: TEX 30a manufactured by Japan Steel Works, Ltd.) at 350 to 380° C. to prepare a thermoplastic resin composition. The thermoplastic resin composition was pelletized. The following "polyether ether ketone" is "Victrex PEEK 381G" manufactured by Victrex Corporation. "Victrex" is a registered trademark of Victrex Corporation. The following "acetylene black" is "Denka Black" manufactured by Denka Company Limited. "Denka Black" is a registered trademark of Denka Company Limited.

Polyether ether ketone: 100 parts by mass
Acetylene black: 20 parts by mass

Subsequently, the pellet-shaped thermoplastic resin composition was put in a single screw extruder (trade name: GT40 manufactured by Plastics Engineering Laboratory Co., Ltd.) with a set temperature of 380° C., and melted and extruded from a circular die to obtain a tubular extrudate. This extrudate was cut to manufacture an endless belt-shaped base layer 4 made of PEEK and having a thickness of 100 μm, a peripheral length of 750 mm, and a width of 359 mm.

[Preparation of Inorganic Alkoxides 1 to 6]

Tetraethoxysilane ($Si(OEt)_4$) as inorganic alkoxide 1, tetramethoxysilane ($Si(OMe)_4$) as inorganic alkoxide 2, tetra-n-propoxysilane ($Si(OPr)_4$) as inorganic alkoxide 3, zirconium tetra-n-propoxide ($Zr(OPr)_4$) as inorganic alkoxide 4, titanium tetra-n-ethoxide ($Ti(OEt)_4$) as inorganic alkoxide 5, and aluminum triethoxide ($Al(OEt)_3$) as inorganic alkoxide 6 were prepared.

[Preparation of Black Titanium Compound 1]

Synthesis was performed by a method described in the above Non-Patent Literature "Synthesis of Ti4O7 Nanoparticles by Carbothermal Reduction Using Microwave Rapid Heating (Catalysts 2017, 7, 65-)" to obtain a black titanium compound having a composition of Ti4O7 (average particle diameter: 60 nm). The L value of this black titanium compound was measured with a color difference meter "CR-400" manufactured by Konica Minolta Inc. As a result, the L value was 14.0.

100 parts by volume of the black titanium compound synthesized by the above method, 12 parts by volume of 3-acryloxypropyl trimethoxysilane ("KBM-5103" manufactured by Shin-Etsu Chemical Co., Ltd.), and 400 parts by volume of methanol were mixed and dispersed for 45 minutes using a wet media dispersing type device. Subsequently, methanol was removed, and then the resulting powder was dried at 150° C. for 20 minutes. In this manner, a black titanium compound 1 as a surface-treated black titanium compound was obtained. The black titanium compound 1 had an L value of 14.6.

[Preparation of Black Titanium Compound 2]

Drying was performed in a similar manner to the preparation of the black titanium compound 1 except that a surface treatment agent 2 (3-aminopropyl triethoxysilane ("KBE-903" manufactured by Shin-Etsu Chemical Co., Ltd.) was used in place of the surface treatment agent 1, the dispersion time with the wet media dispersing type device was changed to 80 minutes, and the drying conditions after removal of methanol were changed to 1/20 atm, 50° C., and 30 minutes. In this manner, a black titanium compound 2 as a surface-treated black titanium compound was obtained.

[Preparation of Black Titanium Compound 3]

100 parts by volume of "Titanium black UF-8" (manufactured by Mitsubishi Materials Corporation, L value: 8.4), 16 parts by volume of 3-acryloxypropyl trimethoxysilane ("KBM-5103" manufactured by Shin-Etsu Chemical Co., Ltd., also referred to as "surface treatment agent 1"), and 400 parts by volume of methanol were mixed and dispersed for 45 minutes using a wet media dispersing type device. Subsequently, methanol was removed, and the resulting product was dried at 150° C. for 10 minutes. In this manner, a black titanium compound 3 as a surface-treated black titanium compound was obtained.

[Preparation of Black Titanium Compound 4]

Titanium dioxide (number average particle diameter: 100 nm) and a Ti powder (number average particle diameter: 100 nm) were mixed so as to have a molar ratio of 3:1, and heated in a vacuum of 10 to 2 torr at 800° C. for 15 hours to obtain low-order titanium oxide particles containing Ti$_2$O$_3$ as a main component. This low-order titanium oxide particles had a BET value of 14.5 m$^3$/g. An X-ray diffraction method was used for identification of the main component. The low-order titanium oxide particles had an L value of 9.1.

100 parts by volume of the low-order titanium oxide particles, 11 parts by volume of 3-acryloxypropyl trimethoxysilane ("KBM-5103" manufactured by Shin-Etsu Chemical Co., Ltd.), and 400 parts by volume of methanol were mixed and dispersed for 45 minutes using a wet media dispersing type device. Subsequently, methanol was removed, and then the resulting powder was dried at 150° C. for 20 minutes. In this manner, a black titanium compound 4 as a surface-treated black titanium compound was obtained. The black titanium compound 4 had an L value of 9.3.

[Preparation of Black Titanium Compound 5]

Titanium dioxide (number average particle diameter: 100 nm) and a Ti powder (number average particle diameter: 100 nm) were mixed so as to have a molar ratio of 1:1, and heated in a vacuum of 10 to 2 torr at 900° C. for 30 hours to obtain low-order titanium oxide particles containing TiO as a main component. This low-order titanium oxide particles had a BET value of 16.7 m$^3$/g. An X-ray diffraction method was used for identification of the main component. The low-order titanium oxide particles had an L value of 20.7.

100 parts by volume of the low-order titanium oxide particles, 12 parts by volume of 3-acryloxypropyl trimethoxysilane ("KBM-5103" manufactured by Shin-Etsu Chemical Co., Ltd.), and 400 parts by volume of methanol were mixed and dispersed for 45 minutes using a wet media dispersing type device. Subsequently, methanol was removed, and then the resulting powder was dried at 150° C. for 20 minutes. In this manner, a black titanium compound 5 as a surface-treated black titanium compound was obtained. The black titanium compound 5 had an L value of 21.8.

[Preparation of White Titanium Oxide 1]

100 parts by volume of "TTO-51" (manufactured by Ishihara Sangyo Co., Ltd., average particle diameter: 20 nm), 10 parts by volume of a surface treatment agent 3, and 400 parts by volume of methanol were mixed and dispersed for 60 minutes using a wet media dispersing type device. Subsequently, methanol was removed, and the resulting product was dried at ½0 atm at 50° C. for 30 minutes. White titanium oxide 1 as surface-treated white titanium oxide was obtained.

[Preparation of Coating Liquid 1]

20 parts by volume of the inorganic alkoxide 1 and 100 parts by volume of ethanol (manufactured by Kanto Chemical Co., Ltd., special grade) were continuously stirred in an atmosphere at 25° C. for 20 minutes to prepare a coating liquid 1A. In addition, 5 parts by volume of the black titanium compound 1 and 100 parts by volume of ethanol (manufactured by Kanto Chemical Co., Ltd., special grade) were dispersed using a homogenizer to prepare a coating liquid 1B.

Subsequently, 120 parts by volume of the coating liquid 1A and 10 parts by volume of the coating liquid 1B were mixed. While this mixed liquid was stiffed, a 3 w/v % hydrochloric acid ethanol solution was dropwise added to the mixed liquid until the pH of the mixed liquid became 5. Subsequently, the resulting liquid was left at 45° C. for 30 minutes to form a sol, and a coating liquid 1 for manufacturing a surface layer was prepared.

[Preparation of Coating Liquid 2]

10 parts by volume of the inorganic alkoxide 1, 10 parts by volume of the inorganic alkoxide 2, and 100 parts by volume of ethanol (manufactured by Kanto Chemical Co., Ltd., special grade) were continuously stiffed in an atmosphere at 25° C. for 20 minutes to prepare a coating liquid 2A. In addition, 5 parts by volume of the black titanium compound 2 and 100 parts by volume of ethanol (manufactured by Kanto Chemical Co., Ltd., special grade) were dispersed using a homogenizer to prepare a coating liquid 2B.

Subsequently, 120 parts by volume of the coating liquid 2A and 10 parts by volume of the coating liquid 2B were mixed. While this mixed liquid was stirred, a 3 w/v % hydrochloric acid aqueous solution was dropwise added to the mixed liquid until the pH of the mixed liquid became 5. Subsequently, the resulting liquid was left at 45° C. for 30 minutes to form a sol, and a coating liquid 2 for manufacturing a surface layer was prepared.

[Preparation of Coating Liquid 3]

10 parts by volume of the inorganic alkoxide 1, 10 parts by volume of the inorganic alkoxide 3, and 100 parts by volume of methanol (manufactured by Kanto Chemical Co., Ltd., special grade) were continuously stirred in an atmosphere at 25° C. for 20 minutes to prepare a coating liquid 3A. In addition, 5 parts by volume of the black titanium compound 3 and 100 parts by volume of methanol (manufactured by Kanto Chemical Co., Ltd., special grade) were dispersed using a homogenizer to prepare a coating liquid 3B.

Subsequently, 120 parts by volume of the coating liquid 3A and 10 parts by volume of the coating liquid 3B were mixed. While this mixed liquid was stirred, a 3 w/v % hydrochloric acid aqueous solution was dropwise added to the mixed liquid until the pH of the mixed liquid became 5. Subsequently, the resulting liquid was left at 45° C. for 30 minutes to form a sol, and a coating liquid 3 for manufacturing a surface layer was prepared.

[Preparation of Coating Liquids 4 to 6]

A coating liquid 4 was prepared in a similar manner to preparation of the coating liquid 1 except that 10 parts by volume of the inorganic alkoxide 1 and 10 parts by volume of the inorganic alkoxide 4 were used in place of 20 parts by volume of the inorganic alkoxide 1. In addition, a coating liquid 5 was prepared in a similar manner to preparation of the coating liquid 4 except that the inorganic alkoxide 5 was used in place of the inorganic alkoxide 4 and that a mixed solvent of ethanol and methanol at a volume ratio of 1:1 was used in place of ethanol as a solvent for the coating liquids A and B. Furthermore, a coating liquid 6 was prepared in a similar manner to preparation of the coating liquid 4 except that the inorganic alkoxide 6 was used in place of the inorganic alkoxide 4.

[Preparation of Coating Liquid 7]

A coating liquid 7 was prepared in a similar manner to preparation of the coating liquid 1 except that propylene glycol monomethyl ether was used in place of ethanol as a solvent for the coating liquids A and B and that a HCl2-propanol (IPA) solution was used in place of the hydrochloric acid ethanol solution as a hydrochloric acid solution dropwise added to the mixture liquid.

[Preparation of Coating Liquids 8 and 9]

Coating liquids 8 and 9 were prepared in a similar manner to preparation of the coating liquid 1 except that the black titanium compounds 4 and 5 were used in place of the black titanium compound 1, respectively.

[Preparation of Coating Liquid 10 and 11]

A coating liquid 10 was prepared in a similar manner to preparation of the coating liquid 1 except that the black titanium compound 1 was not used. A coating liquid 11 was prepared in a similar manner to preparation of the coating liquid 1 except that the white titanium oxide 1 was used in place of the black titanium compound 1.

Table 1 illustrates compositions of the coating liquids 1 to 11. In Table 1, "EtOH" represents ethanol, "MeOH" represents methanol, "EtOH/MeOH" represents a mixed solvent thereof, "PGME" represents propylene glycol monomethyl ether, "HCl/EtOH" represents a hydrochloric acid ethanol solution, "HCl/H$_2$O" represents a hydrochloric acid aqueous solution, and "HO/IPA" represents a hydrochloric acid 2-propanol solution (IPA solution).

TABLE 1

| Coating liquid No. | Titanium compound No. | Sol Inorganic alkoxide No. 1 | 2 | Solvent | Catalyst for forming sol |
|---|---|---|---|---|---|
| 1 | Black 1 | 1 | — | EtOH | HCl/EtOH |
| 2 | Black 2 | 1 | 2 | EtOH | HCl/H$_2$O |
| 3 | Black 3 | 1 | 3 | MeOH | HCl/H$_2$O |
| 4 | Black 1 | 1 | 4 | EtOH | HCl/EtOH |
| 5 | Black 1 | 1 | 5 | EtOH/MeOH | HCl/EtOH |
| 6 | Black 1 | 1 | 6 | EtOH | HCl/EtOH |
| 7 | Black 1 | 1 | — | PGME | HCl/IPA |
| 8 | Black 4 | 1 | — | EtOH | HCl/EtOH |
| 9 | Black 5 | 1 | — | EtOH | HCl/EtOH |
| 10 | — | 1 | — | EtOH | HCl/EtOH |
| 11 | White 1 | 1 | — | EtOH | HCl/EtOH |

Example 1

The coating liquid 1 was applied onto an outer peripheral surface of the base layer 1 by an applying method with a bar coater using an applying device so as to have a dry film thickness of 1.2 μm to manufacture a coating film of the coating liquid 1 on a surface of the base layer 1. Then, using a warm air furnace, the coating film was primarily heated at 80° C. for 10 minutes and then secondarily heated at 120° C. for 30 minutes to cure the coating film to manufacture a surface layer. In this manner, an intermediate transfer body 1 was manufactured.

Example 2

An intermediate transfer body 2 was manufactured in a similar manner to Example 1 except that the coating liquid 2 was applied in place of the coating liquid 1 so as to have a dry film thickness of 2.5 μm and that secondary heating conditions were changed to 150° C. and 40 minutes.

Example 3

An intermediate transfer body 3 was manufactured in a similar manner to Example 1 except that the coating liquid 3 was used in place of the coating liquid 1 and that secondary heating conditions were changed to 150° C. and 40 minutes.

Examples 4 to 6

Intermediate transfer bodies 4 to 6 were manufactured in a similar manner to Example 1 except that the coating liquids 4 to 6 were used in place of the coating liquid 1 and that secondary heating conditions were changed to 150° C. and 60 minutes.

Examples 7 and 8

Intermediate transfer bodies 7 and 8 were manufactured in a similar manner to Example 1 except that the coating liquid 7 was used in place of the coating liquid 1, that the temperature of primary heating was changed to 60° C., that secondary heating conditions were changed to 100° C. and 10 minutes, and that tertiary heating was performed at 180° C. for 60 minutes or at 220° C. for 60 minutes.

Examples 9 and 10 and Comparative Examples 1 and 2

Intermediate transfer bodies 9, 10, 14, and 15 were manufactured in a similar manner to Example 1 except that the coating liquids 8 to 11 were used in place of the coating liquid 1, respectively.

Examples 11 to 13

Intermediate transfer bodies 11 to 13 were manufactured in a similar manner to Example 1 except that the base layers 2 to 4 were used in place of the base layer 1, respectively.

Comparative Example 3

An SiO2 layer (surface layer) was manufactured on a surface of the base layer 1 under an atmospheric pressure using an atmospheric pressure plasma CVD device in accordance with the method described in Example 3 of JP 2007-17666 A. In this manner, an intermediate transfer body 16 was manufactured.

Table 2 illustrates configurations of the intermediate transfer bodies 1 to 16.

TABLE 2

| | Intermediate transfer body No. | Base layer No. | Base layer Material | Surface layer Coating liquid No. | Thickness (μm) | After drying 1 Temperature (° C.) | Time (min) | 2 Temperature (° C.) | Time (min) | 3 Temperature (° C.) | Time (min) |
|---|---|---|---|---|---|---|---|---|---|---|---|
| Example 1 | 1 | 1 | PI | 1 | 1.2 | 80 | 10 | 120 | 30 | — | — |
| Example 2 | 2 | 1 | PI | 2 | 2.5 | 80 | 10 | 150 | 40 | — | — |
| Example 3 | 3 | 1 | PI | 3 | 1.2 | 80 | 10 | 150 | 40 | — | — |
| Example 4 | 4 | 1 | PI | 4 | 1.2 | 80 | 10 | 150 | 60 | — | — |
| Example 5 | 5 | 1 | PI | 5 | 1.2 | 80 | 10 | 150 | 60 | — | — |
| Example 6 | 6 | 1 | PI | 6 | 1.2 | 80 | 10 | 150 | 60 | — | — |
| Example 7 | 7 | 1 | PI | 7 | 1.2 | 60 | 10 | 100 | 10 | 180 | 60 |
| Example 8 | 8 | 1 | PI | 7 | 1.2 | 60 | 10 | 100 | 10 | 220 | 60 |
| Example 9 | 9 | 1 | PI | 8 | 1.2 | 80 | 10 | 120 | 30 | — | — |
| Example 10 | 10 | 1 | PI | 9 | 1.2 | 80 | 10 | 120 | 30 | — | — |

TABLE 2-continued

|  | Intermediate transfer body No. | Base layer No. | Base layer Material | Surface layer Coating liquid No. | Thickness (μm) | After drying 1 Temperature (° C.) | 1 Time (min) | 2 Temperature (° C.) | 2 Time (min) | 3 Temperature (° C.) | 3 Time (min) |
|---|---|---|---|---|---|---|---|---|---|---|---|
| Example 11 | 11 | 2 | PAI | 1 | 1.2 | 80 | 10 | 120 | 30 | — | — |
| Example 12 | 12 | 3 | PEN | 1 | 1.2 | 80 | 10 | 120 | 30 | — | — |
| Example 13 | 13 | 4 | PEEK | 1 | 1.2 | 80 | 10 | 120 | 30 | — | — |
| Comparative Example 1 | 14 | 1 | PI | 10 | 1.2 | 80 | 10 | 120 | 30 | — | — |
| Comparative Example 2 | 15 | 1 | PI | 11 | 1.2 | 80 | 10 | 120 | 30 | — | — |
| Comparative Example 3 | 16 | 1 | PI | — | 0.15 | — | — | — | — | — | — |

[Preparation of Image Forming Device]

Image forming devices having the intermediate transfer bodies 1 to 16 mounted thereon, respectively, in place of a regular intermediate transfer body of an image forming device "Bizhub C658" (manufactured by Konica Minolta, Inc., "bizhub" is a registered trademark of Konica Minolta, Inc.) were prepared.

[Evaluation]

(1) Surface State Before Durability Test

Figure 3:
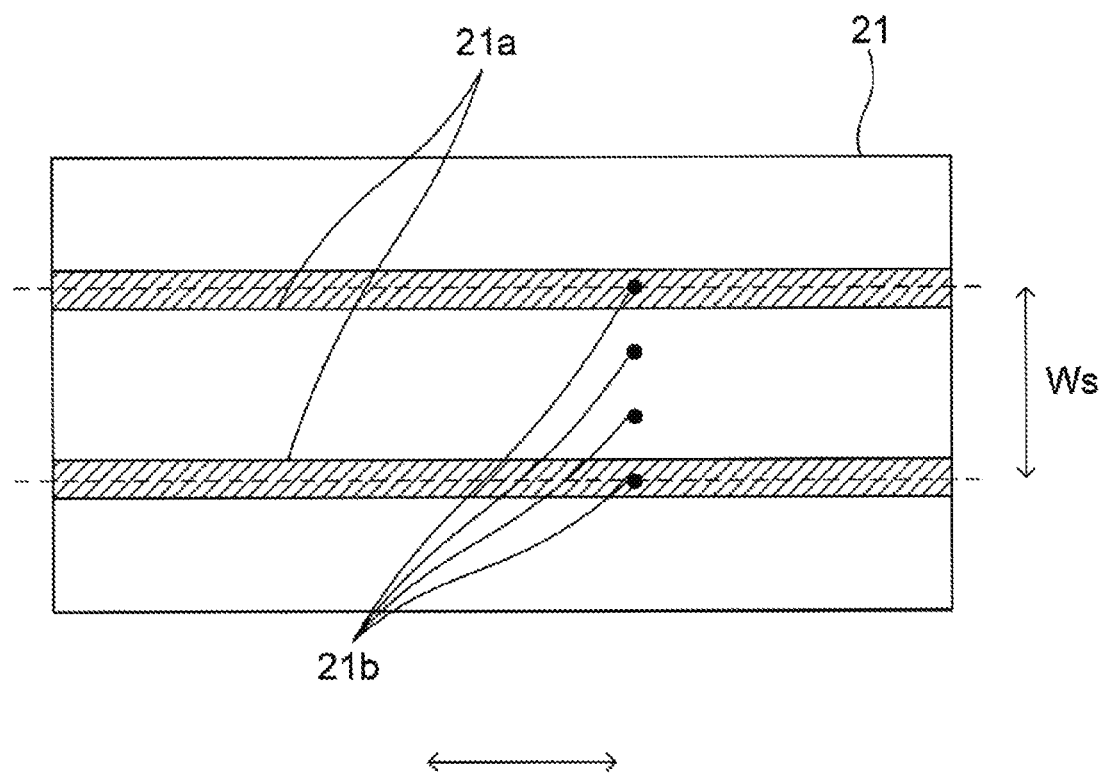
FIG. 3 is a schematic view for explaining a measurement position of a surface state of an intermediate transfer body in evaluation of Examples.

Each of the intermediate transfer bodies 1 to 16 was taken out of the image forming device. An arithmetic average roughness Ra and a maximum height roughness Rz of the four measurement points 21b illustrated in FIG. 3 were measured under the following conditions by observation with a laser microscope, and average values $A_{Ra1}$ and $A_{Rz1}$ of the measured values were obtained. Two of the measurement points 21b were within a sheet passing boundary area (reference numeral: 21a, width: 4 mm), and the remaining two points are at positions equally dividing a distance between the two points in the area into three parts. Note that the sheet passing boundary area 21a is an area through which an end portion of a sheet passes frequently in a durability test described later. In addition, an arrow Ws in FIG. 3 indicates the width of a sheet in contact with the intermediate transfer body in the durability test.

(Conditions)

Model of laser microscope: Vk-X100 manufactured by Keyence Corporation

Objective lens: 20 times

Measurement range: the entire possible range for one observation was used.

Measurement processing: according to a standard method of an attached software. First, automatic tilt correction was performed, and then Ra and Rz were calculated automatically by a standard method of an attached software.

(2) Surface State After Durability Test

A cleaning blade was attached to each of the intermediate transfer bodies 1 to 16, and each of the resulting intermediate transfer bodies 1 to 16 was attached to "Bizhub C658". Subsequently, continuous printing was performed in a duplex printing mode. A printed image was a character image and had a YMCK printing ratio of 5% for each color (20% in total for all the colors). 100,000 sheets were printed in each of an NN environment (20° C., 50% RH) and an LL environment (10° C., 15% RH). For the printing sheets, "Multi Paper Super Economy (A4)" manufactured by ASKUL Corporation was set such that the sheet passing direction was A4 vertical to be used.

Incidentally, in the durability test, all the secondary transfer rollers and sheet feeding rollers were replaced with new ones such that the total load due to sheet dust was exactly the same in all the durability tests of the intermediate transfer bodies, a sheet feeding path was cleaned, and all the sheet dust existing in the sheet feeding path was removed.

After the above durability test, each of the intermediate transfer bodies 1 to 16 was taken out of the image forming device. An arithmetic average roughness Ra and a maximum height roughness Rz of the four measurement points 21b which were the same as the points 21b before the durability test were measured by a similar method to the method before the durability test by observation with a laser microscope, and average values $A_{Ra2}$ and $A_{Rz2}$ of the measured values were obtained. Furthermore, as for the average values of Ra and Rz, ratios rRa and rRz, which are ratios of Ra and Rz after the durability test with respect to Ra and Rz before the durability test, respectively, were determined, and judged according to the following criteria. An increase in rRa and rRz after the durability test can be judged to be occurrence of cracking or unevenness on a surface of the intermediate transfer body or local lack of a surface layer, resulting in deterioration of mechanical characteristics of the surface.

(Criteria of rRa)

⊙: rRa is less than 1.1
○: rRa is 1.1 or more and less than 1.3
Δ: rRa is 1.3 or more and less than 1.5
x: rRa is 1.5 or more and less than 2.0
xx: rRa is 2.0 or more (Criteria of rRz)

⊙: rRz is less than 2.0
○: rRz is 2.0 or more and less than 3.5
Δ: rRz is 3.5 or more and less than 5.0
x: rRz is 5.0 or more and less than 7.5
xx: rRz is 7.5 or more (3) Image Quality After Durability Test After the durability test, in each of the intermediate transfer bodies 1 to 16, humidity was adjusted for 12 hours or more in an environment of 20° C. 50% RH (NN environment), 10° C. 15% RH (LL environment), or 30° C. 85% RH (HH environment). The power of the image forming device was turned on. Image stabilization was performed by combining a new developing device filled with a new developer (developer containing a developing agent, a new toner, and a new carrier), an intermediate transfer body for experiments, and a new photosensitive unit.

Next, as a sheet type registration, a sheet equivalent to thick sheet 3 was used, and two sheets of CF paper (A3, basis weight: 80 g/m$^3$) manufactured by Konica Minolta Inc.

each having a blue solid image on one side thereof were printed. sheet type registration of the thick sheet 3 was performed in order to lower a printing speed and make image unevenness stand out. Out of the above solid images, a solid image of a bad appearance was judged according to the following criteria. Here, the image unevenness refers to all the phenomena derived from non-uniformity of image density.

(Criteria)

⊙: There is no unevenness in visual observation, and a sample is excellent

○: Unevenness in visual observation can be observed by careful observation, but a sample is acceptable Δ: There is unevenness in visual observation, and a sample corresponds to a lower limit of acceptance x: There is image unevenness that anyone can see, and a sample is not acceptable xx: Image unevenness is severe, density uniformity is lacking, and a sample is out of the question Results are illustrated in Table 3.

TABLE 3

| | Surface state | | | | | | | | | | |
|---|---|---|---|---|---|---|---|---|---|---|---|
| | Before durability test | | After durability test | | Ra | | Rz | | Image quality | | |
| | $A_{Ra1}$ (μm) | $A_{Rz1}$ (μm) | $A_{Ra2}$ (μm) | $A_{Rz2}$ (μm) | rRa (−) | Judge-ment | rRz (−) | Judge-ment | NN | LL | HH |
| Example 1 | 0.321 | 1.063 | 0.349 | 1.481 | 1.09 | ⊙ | 1.39 | ⊙ | ⊙ | ⊙ | ⊙ |
| Example 2 | 0.314 | 1.053 | 0.343 | 1.801 | 1.09 | ⊙ | 1.71 | ⊙ | ⊙ | ⊙ | ⊙ |
| Example 3 | 0.338 | 1.142 | 0.370 | 1.657 | 1.09 | ⊙ | 1.45 | ⊙ | ⊙ | ⊙ | ⊙ |
| Example 4 | 0.375 | 1.277 | 0.424 | 2.810 | 1.13 | ○ | 2.20 | ○ | ⊙ | ⊙ | ○ |
| Example 5 | 0.368 | 1.280 | 0.431 | 2.931 | 1.17 | ○ | 2.29 | ○ | ⊙ | ⊙ | ○ |
| Example 6 | 0.381 | 1.283 | 0.425 | 2.724 | 1.12 | ○ | 2.12 | ○ | ⊙ | ⊙ | ○ |
| Example 7 | 0.316 | 1.058 | 0.352 | 1.514 | 1.11 | ○ | 1.43 | ⊙ | ⊙ | ⊙ | ⊙ |
| Example 8 | 0.325 | 1.310 | 0.458 | 4.410 | 1.17 | ○ | 3.37 | ○ | ○ | ⊙ | ○ |
| Example 9 | 0.318 | 1.082 | 0.346 | 1.518 | 1.09 | ⊙ | 1.40 | ⊙ | ⊙ | ⊙ | ⊙ |
| Example 10 | 0.324 | 1.267 | 0.471 | 4.133 | 1.09 | ⊙ | 1.53 | ⊙ | ⊙ | ⊙ | ⊙ |
| Example 11 | 0.333 | 1.132 | 0.362 | 1.633 | 1.09 | ⊙ | 1.44 | ⊙ | ⊙ | ⊙ | ⊙ |
| Example 12 | 0.329 | 1.129 | 0.358 | 1.765 | 1.09 | ⊙ | 1.56 | ⊙ | ⊙ | ⊙ | ⊙ |
| Example 13 | 0.337 | 1.138 | 0.367 | 1.923 | 1.09 | ⊙ | 1.69 | ⊙ | ⊙ | ⊙ | ⊙ |
| Comparative Example 1 | 0.273 | 0.749 | 0.672 | 6.966 | 2.46 | xx | 9.30 | xx | x | xx | xx |
| Comparative Example 2 | 0.308 | 0.978 | 0.501 | 6.530 | 1.63 | x | 6.68 | x | x | x | xx |
| Comparative Example 3 | 0.254 | 0.722 | 0.679 | 7.141 | 2.67 | xx | 9.89 | xx | x | xx | xx |

As is apparent from Table 3, in each of Examples 1 to 13, fluctuation of surface roughness by the durability test is sufficiently small, and the image quality after the durability test is also sufficient. Particularly, in Examples 1 to 3 and 11 to 13, a change in the surface state by the durability test is very small, and the image quality after the durability test is good. It is considered that this is because (1) the content of the black titanium compound in the surface layer is appropriate, and therefore the electric resistance in a cross-sectional direction is lower than that in a case of not adding the black titanium compound, and there is no unevenness in electric resistance at each point, (2) the content of the black titanium compound in the surface layer is appropriate, and therefore an amorphous property required as a cured film by a metal alkoxide is strengthened, and a strong film against cracking or the like is formed, (3) the reactivity of the metal alkoxide is stable, the reproducibility of surface layer forming conditions is good, and minute defects are hardly generated, and (4) the manufacturing process temperature is 200° C. or lower, deterioration of the black titanium compound does not occur, and an effect by the black titanium compound is exhibited to the maximum.

Meanwhile, in Comparative Examples 1 to 3, a change in the surface state by the durability test is large, and the image quality after the durability test is also insufficient. In Comparative Examples 1 and 3, it is considered that this is because mechanical strength of the surface layer is insufficient because of inclusion of no filler in the surface layer, and as a result, the surface state of the surface layer changed largely due to cracking or the like. In Comparative Example 2, it is considered that this is because the surface layer contains white titanium oxide which is a material having higher hydrophilicity than the black titanium compound, mechanical strength of the surface layer is thereby lowered due to accumulation of a high polar component such as moisture, and as a result, the surface state of the surface layer changed largely.

According to the present invention, in an electrophotographic method, it is possible to form a high-quality image in which generation of image defects due to transfer failure is suppressed over a long period of time. Therefore, according to the present invention, further spread of the image forming device is expected.

Although embodiments of the present invention have been described and illustrated in detail, the disclosed embodiments are made for purposes of illustration and example only and not limitation. The scope of the present invention should be interpreted by terms of the appended claims

What is claimed is:

1. An intermediate transfer body comprising: a base layer made of a resin; and a surface layer disposed on the base layer, wherein
    the surface layer is an integral object of inorganic oxide and contains a black titanium compound dispersed in the surface layer, and
    the integral object is an integral three-dimensional cross-linked structure formed from the inorganic oxide.

2. The intermediate transfer body of claim 1, wherein the black titanium compound contains one or both of trivalent titanium and low-order titanium oxide.

3. The intermediate transfer body of claim 1, wherein the black titanium compound is bonded to the inorganic oxide via a residue of a silane coupling agent.

4. The intermediate transfer body of claim 1, wherein the black titanium compound contains no nitrogen atom.

5. The intermediate transfer body of claim 1, wherein the inorganic oxide is formed of one or more elements selected from the group consisting of silicon, zirconium, aluminum, and titanium.

6. The intermediate transfer body of claim 1, wherein the resin of the base layer contains polyimide, polyamide imide, polyethylene naphthalate, or polyether ether ketone.

7. The intermediate transfer body according to claim 1, wherein the surface layer has a thickness of 0.4 to 8.0 μm.

8. A method for manufacturing the intermediate transfer body of claim 1, comprising:
   generating the inorganic oxide from a precursor of the inorganic oxide in a dispersion containing the precursor and the black titanium compound;
   forming a coating film of a coating material in which the inorganic oxide has been generated on the base layer; and
   drying and solidifying the coating film of the coating material to manufacture the surface layer.

9. The method for manufacturing an intermediate transfer body of claim 8, wherein an inorganic alkoxide is used as the precursor, the inorganic oxide is generated by a sol-gel method, and the surface layer is manufactured.

10. An electrophotographic image forming device comprising the intermediate transfer body of claim 1.

* * * * *